E. S. LAMMERS, Jr.
ELECTRICAL SYSTEM.
APPLICATION FILED NOV. 7, 1916.

1,396,853.

Patented Nov. 15, 1921.
2 SHEETS—SHEET 1.

WITNESSES:
A. J. Fitzgerald
J. R. Langley

INVENTOR
Edwin S. Lammers, Jr.
BY
Wesley G. Carr
ATTORNEY

E. S. LAMMERS, Jr.
ELECTRICAL SYSTEM.
APPLICATION FILED NOV. 7, 1916.

1,396,853.

Patented Nov. 15, 1921.
2 SHEETS—SHEET 2.

WITNESSES:
O. J. Fitzgerald
J. R. Langley

INVENTOR
Edwin S. Lammers, Jr.
BY
Wesley G. Carr
ATTORNEY

UNITED STATES PATENT OFFICE.

EDWIN S. LAMMERS, JR., OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,396,853.  Specification of Letters Patent.  Patented Nov. 15, 1921.

Application filed November 7, 1916. Serial No. 129,972.

*To all whom it may concern:*

Be it known that I, EDWIN S. LAMMERS, Jr., a citizen of the United States, and a resident of Wilkinsburg, in the county of Allegheny and State of Pennsylvania, have invented a new and useful Improvement in Electrical Systems, of which the following is a specification.

My invention relates to electrical systems and particularly to such systems as embody a generator and a motor that are permanently connected in circuit.

My invention has for its object to provide a system of the character indicated above by means of which the voltage of electric generators may be controlled automatically in accordance with conditions obtaining in their main circuits.

In the operation of motors which are used in connection with hoists or with rolling mills where frequent stops and reversals are necessary, it is desirable that the motors be accelerated at a maximum rate in order to prevent the waste of much valuable time. To accomplish this result, it is necessary that the current supplied to electric motors shall be maintained at maximum safe values throughout the entire periods of acceleration from standstill to normal operating speeds.

In accordance with my invention, a generator and a motor are permanently connected in a closed circuit. The speed and direction of operation of the motor are controlled by varying the voltage of the generator in value and in direction. The voltage of the generator is controlled by varying the field excitation of an exciter which is in circuit with the generator field-magnet windings.

A resistor, that is in circuit with the field-magnet winding of the exciter, is controlled by a manually operable arm and by a relay of the well-known fluttering type that is controlled in accordance with conditions obtaining in the main circuit comprising the motor and generator armatures. A relay, which may be termed a transfer relay, operates automatically in accordance with the values of the current traversing the main circuit and the voltage of the generator to reverse the effects of the operation of the fluttering relay.

Figure 1:
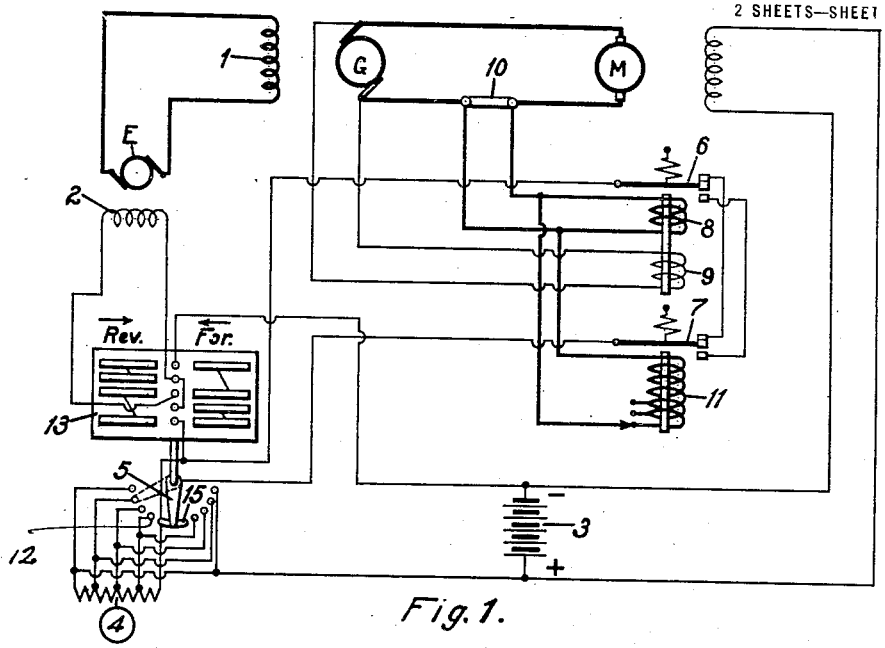
Figure 2:
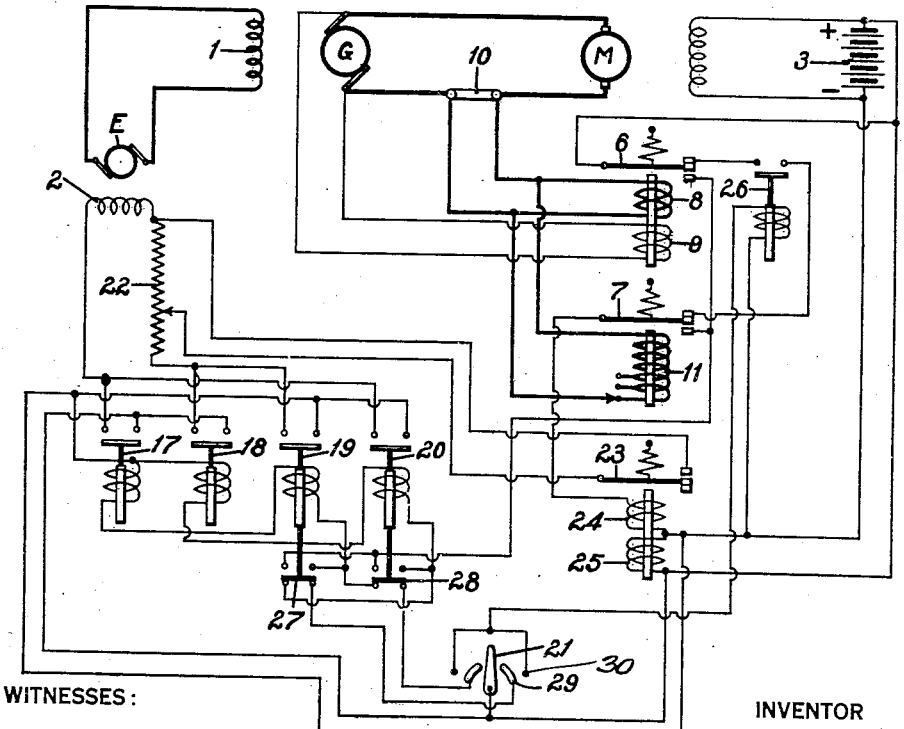
Figure 3:
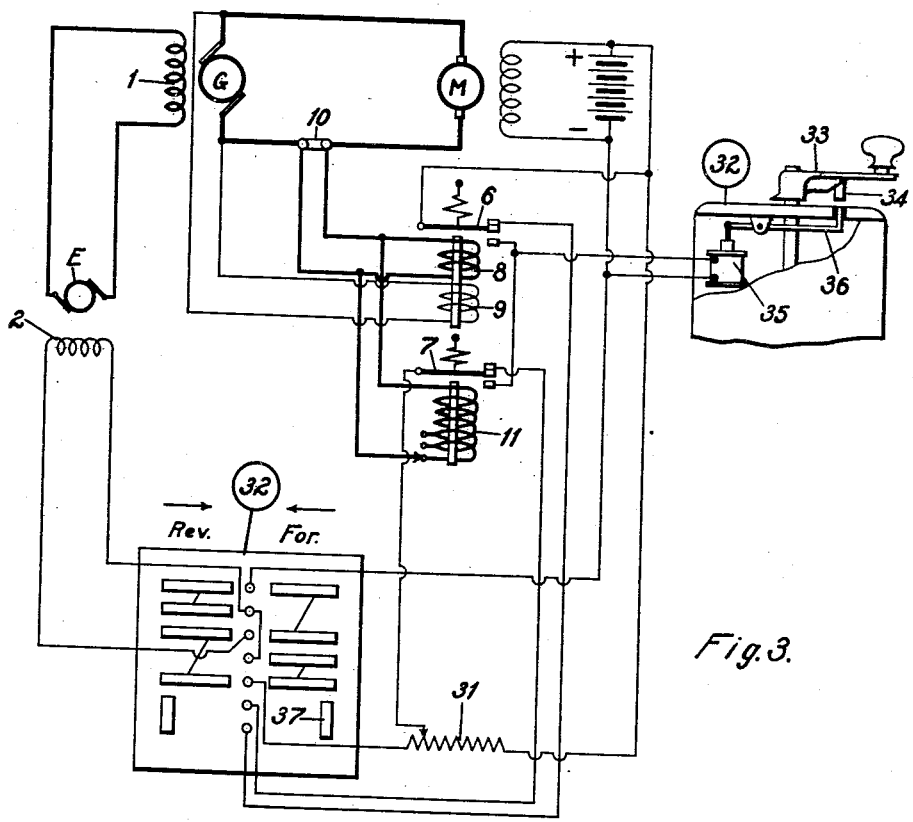
Figure 4:
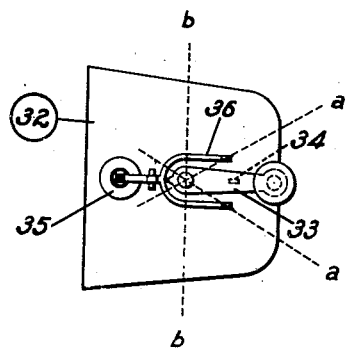

The details of my invention will be described in connection with the accompanying drawings in which Figure 1 is a diagrammatic view of circuits and apparatus embodying my invention. Fig. 2 is a view, similar to Fig. 1, of a modification. Fig. 3 is a view, similar to Fig. 1, of a second modification. Fig. 4 is a plan view of a controller embodying an interlocking mechanism.

Referring particularly to Fig. 1, the armature windings of a separately excited generator G and a motor M that is separately excited from any suitable source of constant voltage, are connected in series relation in a closed circuit. The generator G has a field-magnet winding 1 that is in circuit with the armature winding of an exciter E. The exciter has a field-magnet winding 2 that is in circuit with a suitable source of current of substantially constant voltage which may be, for example, a storage battery 3. The advantage of employing the exciter E for energizing the field-magnet winding 1, instead of energizing it directly from the battery 3, is that the necessity for employing the large contactors which are found in present-day installations for controlling the resistor that is in circuit with the generator field-magnet winding is thereby done away with. Instead of these large contactors, the very small sensitive relays 6 and 7, hereinafter referred to, are alone employed and these may be contained in small compass at a distance from the dynamo-electric machines.

A manually controlled resistor 4, which may be, for example, the usual field rheostat, has a manually operable arm 5 which shunts more or less of the resistor in accordance with its position. A shunt circuit for the resistor 4 is controlled by a transfer relay 6 and a fluttering relay 7. The relay 6 is provided with two actuating coils 8 and 9 which are respectively connected across the terminals of a resistor 10 in series with the motor and generator armatures and across the terminals of the generator armature. The relay 6 is accordingly controlled in accordance with the current traversing the main circuit and with the voltage of the generator.

The relay 7 is provided with a coil 11 that is also connected across the terminals of the resistor 10. The latter relay is operable entirely in accordance with the value of the current traversing the main circuit.

It may be assumed that the motor M is not in operation and that the generator G and the exciter E are driven at substantially constant speeds. It may be assumed, further, that a reversing switch 13 is in its central or inoperative position in which the circuit of the field-magnet winding 2 is open. Under the above conditions, the relays 6 and 7 occupy their respective normal or illustrated positions.

It may be assumed that the reversing switch 13 is actuated to the left, as viewed in the drawing, to establish the circuits of the field-magnet winding 2 of the exciter E in such manner that the electromotive force of the generator G causes the motor M to operate in the forward direction. The rheostat arm 5, which is operatively connected to the switch 13, is actuated to gradually shunt the resistor 4.

Upon the initial completion of the circuit of the field-magnet winding 2, the entire resistor 4 is in circuit therewith, and the voltages of the exciter E and of the generator G are, accordingly, of low value. As the rheostat arm 5 moves in a clockwise direction, the resistor 4 is shunted and an increased current traverses the field-magnet winding 2. The voltage of the generator G is increased to a corresponding degree, and a correspondingly heavier current is supplied to the motor M. If the rheostat arm 5 is actuated to shunt the resistor 4 at such rate that an excessive current is supplied to the motor, the coil 11 of relay 7, which is of the well-known fluttering type, is sufficiently energized to actuate the relay to its lower position.

The actuation of the relay 7 to its lower position opens a circuit for shunting such portion of the resistor 4 as is included between that terminal of the resistor to which the relay 6 is connected and the contact member which the arm 5 engages in its adjusted position. This shunt circuit extends from a contact member 15 through relay 6, which is in its illustrated position, relay 7 and rheostat arm 5, which may, for example, occupy the position indicated by dotted lines, to an intermediate point of the resistor 4. The effect of the opening of this circuit is to insert the entire resistor 4 in circuit with the field magnet winding 2 and thus reduce the voltages of the exciter and of the generator.

When the current traversing the motor circuit falls to a predetermined value, the coil 11 of relay 7 is sufficiently deënergized to permit the latter to assume its illustrated position and again complete a shunt circuit for such portion of the resistor 4 as corresponds to the position of the rheostat arm 5. The oscillation of the relay 7 continues until the motor has accelerated to such degree that the current traversing its circuit is below the predetermined value at which the relay 7 operates.

If a gradual acceleration of the motor is desired, the rheostat arm 5 is actuated in a step-by-step manner to gradually shunt the resistor 4. In practice, however, the reversing switch 13 and the rheostat arm 5 are actuated quickly to the respective limits of their paths of movement. The voltage of the generator G assumes a maximum value substantially simultaneously with the adjustment of the controlling mechanism.

A heavy rush of current traverses the motor circuit which causes the relay 7 to oscillate in the manner above described. The oscillation of the relay 7 continues until the motor has accelerated to its normal operating speed at which the current traversing its circuit is below the value for which the coil 11 is adjusted. By means of this arrangement, the current traversing the motor circuit is maintained at a substantially constant value throughout the period of acceleration. The system is so arranged that the current is maintained at the maximum safe value at which the motor may be operated.

When it is desired to decrease the speed of the motor, the rheostat arm 5 is gradually or at once actuated to its first accelerating position 12 to insert the resistor 4 in series with the field-magnet winding 2. If the value of the voltage of the generator becomes less than that of the counter-electromotive force of the motor, the latter operates as a generator, and current traverses the closed circuit comprising the motor and the generator armatures in the reverse direction. If the voltage of the generator has a relatively low value, the current traversing the dynamic braking circuit may become excessive.

Upon the reversal of the direction of flow of current in the closed circuit, current traverses the coil 8 in the opposite direction and its force assists that of the coil 9 to draw the armature of relay 6 downwardly to open the shunt circuit for the resistor 4 that is normally closed by the relays 6 and 7.

If the current traversing the closed circuit becomes excessive, the coil 11 is energized to actuate the relay 7 to its lower position and thereby complete a shunt circuit for the resistor 4. This circuit is identical with that traced above in connection with the operation of the relays 6 and 7 except that it includes the lower contact members of each of the relays instead of the upper members.

The shunting of the resistor 4 operates to strengthen the field of the generator, and the current traversing the closed circuit is momentarily reduced by reason of the increased electromotive force of the generator opposing the counter-electromotive force of the motor. The relay 7 oscillates or flutters during such time as the value of the current traversing the dynamic braking circuit exceeds the predetermined safe value for which the coil 11 is adjusted.

If the arm 5 is gradually actuated to the position 12, the dynamic braking current may not exceed the predetermined value at which the relay 7 operates. The arm 5 may, however, be adjusted to its first operating position 12 by a quick movement. In the latter case, the field excitation of the generator is weakened to such degree that a heavy rush of current occurs in the closed circuit, and the relay 7 operates to periodically shunt the resistor 4 and thereby maintain the dynamic braking current at a substantially constant maximum safe value. The rheostat 5 and the reversing switch 13 may be adjusted to their respective "off" positions when the speed of the motor is relatively low.

Reference may now be had to Fig. 2, in which similar characters are employed to designate corresponding parts. Reversing switches 17, 18, 19 and 20 control the connections of the field-magnet winding 2 of the exciter to a source of energy which may be, for example, a storage battery 3. The circuits of the actuating coils of the reversing switches are controlled by a master switch 21.

A resistor 22, which may be the usual manually operable field rheostat similar to the resistor 4 of Fig. 1, is controlled by a relay 23. The relay 23 is provided with actuating coils 24 and 25 which, when energized, oppose each other. The coil 24 is normally energized by a circuit controlled by the relays 6 and 7 which correspond to the relays bearing similar reference characters in the system of Fig. 1. The coil 25 is permanently connected in circuit with the battery 3.

The circuits controlled by the relays 6 and 7 are controlled by an electromagnetic switch or relay 26 having an actuating coil that is controlled by the master switch 21. The reversing switches 19 and 20 are respectively provided with interlocks 27 and 28 for completing a holding circuit for the actuating coils of the respective pairs of reversing switches.

It may be assumed that the resistor 22 is adjusted to such position that the motor M operates at the desired running speed when it has been fully accelerated and the relay 23 occupies its illustrated position in which a shunt circuit for a portion of the resistor is open. To accelerate the motor, the master switch 21 is actuated to the one or the other of its operative positions. It may be assumed, for example, that the switch arm is actuated to the right, as viewed in Fig. 2, to complete a circuit which extends from the positive terminal of the storage battery through movable arm and contact member 29 of switch 21, interlock 27, and actuating coils of switches 20 and 18, to the negative terminal of the battery.

The switches 18 and 20 close to complete a circuit which extends from the positive terminal of the battery through switch 18, resistor 22, field-magnet winding 2, and switch 20, to the negative terminal of the battery. The motor then operates at a low or "creeping" speed because the entire resistor 22 is in circuit with the field-magnet winding 2 and the generator voltage is, accordingly, of low value. The actuation of master switch 21 to its normal operative position completes a circuit for the actuating coil of relay 26 through a contact member 30 and the latter closes to complete the circuit controlled by the relays 6 and 7. The coil 24 is thereupon energized to neutralize the effect of the coil 25, whereupon the relay 23 is actuated by its spring to its upper position. A portion of the resistor 22 is thus shunted.

Since the resistor 22 is adjusted for normal operation of the motor, a heavy rush of current traverses the motor circuit under these conditions. The relay 7 is actuated to its lower position to open the circuit of the coil 24. The coil 25, which is now unopposed, actuates the relay 23 to its lower position to open the shunt circuit for a portion of the resistor 22. The oscillations of the relays 7 and 23 continue until the motor has accelerated to such degree that the current traversing its circuit is below the predetermined value at which the relay 7 operates.

When it is desired to stop the motor, the master switch 21 is actuated toward its illustrated position. When the arm of the master switch 21 is disengaged from contact member 30, the circuit of the actuating coil of relay 26 is broken and the latter opens to break the circuit of the coil 24 of relay 23.

The coil 25 actuates relay 23 to its lower position to open the shunt circuit for the resistor 22, and the latter is inserted in circuit with the exciter field-magnet winding. The field excitation of the generator G is reduced to such degree that the value of the counter-electromotive force of the motor exceeds that of the voltage of the generator. The current traversing the closed circuit comprising the armatures of the motor and the generator is reversed and the relay 6 is actuated to its lower position to complete a circuit which extends from the positive terminal of the battery through the relay 6, the interlock 28, which is in its upper position when the switch 21 is maintained in contact with the contact member 29, and actuating coils of switches 20 and 18, to the negative terminal of the battery. The circuit above traced constitutes a holding circuit for the reversing switches and is maintained so long as the current traversing the dynamic braking circuit exceeds a predetermined safe value at which the voltage of the generator may safely be reversed.

The inserting of resistor 22 in circuit with the field-magnet winding 2 of the exciter operates to materially decrease the field excitation of the generator, and a heavy rush of current flows through the closed circuit which constitutes a dynamic braking circuit for the motor. The relay 7 is actuated to its lower position to complete the energizing circuit of the coil 24. The coils 24 and 25 now oppose each other, and the relay 23 closes to shunt a portion of the resistor 22.

The field of the generator G is strengthened momentarily and the current traversing the closed circuit falls below the predetermined value. The relay 7 then moves to its upper position to open the circuit of coil 24 and the relay 23 is again opened by the force of coil 25. The oscillations of relays 7 and 23 continue so long as the current traversing the dynamic braking circuit tends to exceed a maximum safe value. The arrangement operates to maintain the dynamic braking current at a substantially constant value during the period of deceleration.

The reversing switches 18 and 20 remain closed until the current traversing the closed circuit falls to such value that the reverse-current relay 6 returns to its upper position to open the holding circuit for the coils 18 and 20 which was established through interlock 28. The operation of the master switch 21 to the left is ineffective to complete the circuit of the actuating coils of switches 17 and 19 by reason of the fact that the circuit of these coils is open at interlock 28.

By means of the above described arrangement, the reversal of the motor is prevented during such time as the current traversing the dynamic braking circuit exceeds a predetermined safe value. The relay 23 performs the same functions as the relay 7 of the system of Fig. 1. It is sometimes desirable, however, to employ a relay that is capable of carrying a relatively heavy current and is positive in its action for controlling the shunt circuit of the resistor, while a more delicately balanced relay may be employed for controlling the operation of the shunting relay.

Referring now to Fig. 3, in which similar reference numerals are employed to designate corresponding parts, the relays 6 and 7 are employed in the same manner and in the same relations as in the system of Fig. 1. A variable resistor 31 may correspond substantially in structure and in function to the resistor 4 of Fig. 1, except that it is not mechanically connected to the reversing switch. The development of a reversing switch 32 and the mechanical arrangement of the same are, for purposes of convenience, shown in different portions of the figure.

The reversing switch is provided with an operating handle 33 having a downwardly projecting portion 34. A solenoid 35 controls a pivoted yoke member 36 of substantially U-shape which coacts with the projection 34 to prevent the actuation of the handle 33 to certain operative positions, under predetermined conditions.

To start the motor M, the controller handle 33 is actuated in such direction as to actuate the movable contact segments to the left, as viewed in the drawing. When the controller arm occupies position a (Fig. 4), the several horizontally extending contact segments engage the corresponding contact fingers and a circuit is completed which extends from the positive terminal of the battery through resistor 31, controller 32, field-magnet winding 2, and controller 32, to the negative terminal of the battery.

When the controller 32 reaches the limit of its path of movement indicated at b (Fig. 4), a shunt circuit for the resistor 31 is completed which extends from the right-hand terminal of the resistor 31 through relay 6, contact segment 37 and relay 7, to the other terminal of the resistor 31. The relay 7 oscillates, in the manner previously described in connection with Fig. 1, to maintain the current traversing the motor circuit at a substantially constant value during the period of acceleration.

To stop the motor, the controller 32 is actuated in the reverse direction to disengage contact segment 37 from the coacting contact fingers and thus open the shunt circuit of the resistor 31. The field excitation of the generator G is materially decreased and the motor operates as a generator. Current now traverses the closed circuit in the reverse direction and the relay 6 is accordingly actuated to its lower position.

The relay 7 oscillates in the manner previously described to periodically close a shunt circuit for the resistor 31 through the relay 6 in order to maintain the dynamic braking current at a predetermined value. The relay 6, in its lower position, closes a circuit for the coil 35 and the latter is energized to actuate the yoke member 36 upwardly.

The solenoid 35 is energized so long as the current traversing the motor circuit is sufficient to retain the relay 6 in its lower position. When the solenoid 35 is energized, the yoke member 36 occupies its uppermost position in which the branches are in the path of movement of the projection 34. It will be noted that, when the controller occupies the one or the other of the positions a, the projection 34 is in vertical alinement with the corresponding projecting arm of the yoke member 36. Under the above conditions, it is impossible to actuate the controller from its inoperative position or from its normal running position *b* to one of the positions *a*. It is therefore impossible to reverse the motor when an appreciable current traverses the main circuit.

The advantages of a system constructed in accordance with my invention are that an electric motor may be accelerated or decelerated within the shortest possible time consistent with safe operation. The currents supplied to the motor during acceleration and traversing the motor circuit during deceleration are maintained at a substantially constant value. The reversal of the motor, when the current traversing its circuit exceeds a predetermined safe value, is effectually prevented by means controlled in accordance with the value of the current.

I claim as my invention:

1. The combination with an electric motor and a source of current therefor, of a resistor for controlling the voltage of said source, a pair of switches for controlling said resistor, each having a normal position and an abnormal position, said switches being adapted to short-circuit said resistor only when they both occupy their normal positions or their abnormal positions, and means for actuating one of said switches only during the deceleration of said motor and said other switch during the acceleration or the deceleration of said motor when the current traversing said motor exceeds a predetermined value.

2. In an electrical system, the combination with an electric motor and an electric generator having armatures connected in series, of means for controlling the voltage of said generator in accordance with the value of the current traversing the armature of said motor and means controlled in accordance with the value of the current traversing the motor armature and the value of the voltage of said generator for reversing the effect of said controlling means.

3. The combination with an electric motor and a generator in circuit therewith having a field-magnet winding and means comprising a resistor for controlling the excitation of said winding, of means for shunting at least a portion of said resistor, a switch operable, when the current traversing said motor exceeds a predetermined value, to render said shunting means ineffective and a switch controlled in accordance with the value of the current traversing said motor and the value of the voltage of said generator for reversing the effect of the operation of said first-named switch.

4. In an electrical system, the combination with an electric motor and a source of current, of a resistor for controlling the voltage of said source, a relay for controlling said resistor in accordance with the value of the current traversing the armature of said motor, and a second relay for modifying the effect of said first relay upon a reversal of the current in the motor circuit.

5. In an electrical system, the combination with an electric motor, a generator in circuit therewith, and an exciter for said generator, of means for controlling the voltage of said exciter in accordance with the current traversing said motor and in accordance with the direction of said current, said means comprising a relay having actuating means responsive to the value of the generator voltage and the direction of said current.

6. In an electrical system, the combination with an electric motor, a generator in circuit therewith, and an exciter for said generator, of means for controlling the voltage of said exciter in accordance with the value of the current traversing said motor and in accordance with the direction of said current, said means comprising a relay, a resistor controlled thereby and a second relay for modifying the effect of the operation of the other relay, said second relay having two actuating coils which assist or oppose each other in accordance with the direction of said current.

7. The combination with a dynamo-electric machine and a reversing controller therefor having an inoperative position and two operative positions corresponding to each direction of operation of said machine, in one of which two positions it controls the direction of operation of said machine and in the other of which two positions it controls the acceleration of said machine, of means for preventing the operation of said controller from said inoperative position or from either of said accelerating positions to said inoperative position when the current traversing said machine exceeds a predetermined value.

In testimony whereof, I have hereunto subscribed my name this 31st day of Oct., 1916.

EDWIN S. LAMMERS, Jr.